US010587463B2

(12) United States Patent
Easterling et al.

(10) Patent No.: US 10,587,463 B2
(45) Date of Patent: Mar. 10, 2020

(54) DISTRIBUTED LIFECYCLE MANAGEMENT FOR CLOUD PLATFORMS

(71) Applicant: HEWLETT PACKARD ENTERPRISE DEVELOPMENT LP, Houston, TX (US)

(72) Inventors: Tyler Easterling, Ft. Collins, CO (US); Kyle Meyer Byerly, Ft. Collins, CO (US); Michael A. Scheetz, Ft. Collins, CO (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 111 days.

(21) Appl. No.: 15/849,203

(22) Filed: Dec. 20, 2017

(65) Prior Publication Data

US 2019/0190778 A1 Jun. 20, 2019

(51) Int. Cl.
*H04L 12/24* (2006.01)
*G06F 9/50* (2006.01)
(Continued)

(52) U.S. Cl.
CPC ...... *H04L 41/0806* (2013.01); *G06F 9/45558* (2013.01); *G06F 9/5055* (2013.01);
(Continued)

(58) Field of Classification Search
CPC ... H04L 67/10; H04L 67/1097; G06F 9/5072; G06F 3/067
See application file for complete search history.

(56) References Cited

U.S. PATENT DOCUMENTS

| 6,047,323 A | * | 4/2000 | Krause | G06F 9/54 709/227 |
| 9,081,620 B1 | * | 7/2015 | Chaubal | G06F 9/5072 |

(Continued)

OTHER PUBLICATIONS

Pivotal Software, Inc., "Pivotal Cloud Foundry: the Leading Enterprise Platform Powered by Cloud Foundry," 2016, pp. 1-9, Retrieved from the Internet on May 18, 2017 at URL: <content.pivotal.io/datasheets/pivotal-cloud-foundry-the-leading-enterprise-platform-powered-by-cloud-foundry>.

*Primary Examiner* — Lashonda T Jacobs
(74) *Attorney, Agent, or Firm* — Hewlett Packard Enterprise Patent Department

(57) ABSTRACT

An example system includes a number of nodes, each including a processor and a non-transitory machine readable medium storing a copy of an operating system image. Each copy of the operating system image may include a minimum set of artifacts of a cloud platform application, and lifecycle manager program instructions that, when executed by any of the nodes, instantiate a lifecycle manager for the respective node. The lifecycle manager may be configured to, in response to receiving a platform cluster creation request, automatically establish a cloud platform of the cloud platform application including the respective node as a sole member, and then invite others of the nodes to join the cloud platform. The lifecycle manager may also be configured to, in response to receiving an invitation to join an established cloud platform of the cloud platform application that was established by another one of the nodes, automatically integrate the respective node into the established cloud platform.

20 Claims, 8 Drawing Sheets

(51) Int. Cl.
*G06F 9/455* (2018.01)
*H04L 29/08* (2006.01)

(52) U.S. Cl.
CPC .......... *G06F 9/5072* (2013.01); *G06F 9/5077* (2013.01); *H04L 67/10* (2013.01); *H04L 67/34* (2013.01); *G06F 2009/4557* (2013.01); *G06F 2009/45562* (2013.01)

(56) References Cited

U.S. PATENT DOCUMENTS

| | | | | |
|---|---|---|---|---|
| 9,363,270 | B2 * | 6/2016 | Lakshman | H04L 63/102 |
| 9,658,983 | B1 * | 5/2017 | Barber | G06F 16/219 |
| 9,923,952 | B2 * | 3/2018 | Maes | H04L 67/10 |
| 10,073,689 | B2 * | 9/2018 | Haueter | G06F 8/60 |
| 10,230,568 | B2 * | 3/2019 | Maes | H04L 41/0893 |
| 10,230,580 | B2 * | 3/2019 | Maes | G06F 9/5072 |
| 2012/0102486 | A1 * | 4/2012 | Yendluri | G06F 9/5072 |
| | | | | 717/177 |
| 2012/0158662 | A1 * | 6/2012 | Buragohain | G06F 11/1461 |
| | | | | 707/649 |
| 2012/0266156 | A1 * | 10/2012 | Spivak | G06F 9/5055 |
| | | | | 717/172 |
| 2012/0266168 | A1 | 10/2012 | Spivak et al. | |
| 2013/0232480 | A1 | 9/2013 | Winterfeldt et al. | |
| 2014/0282944 | A1 * | 9/2014 | Li | H04L 41/18 |
| | | | | 726/6 |
| 2015/0100684 | A1 | 4/2015 | Maes et al. | |
| 2015/0120892 | A1 * | 4/2015 | Mordani | H04L 41/5041 |
| | | | | 709/222 |
| 2015/0180949 | A1 | 6/2015 | Maes et al. | |
| 2015/0379009 | A1 * | 12/2015 | Reddy | G06F 16/2255 |
| | | | | 707/747 |
| 2016/0048408 | A1 | 2/2016 | Madhu et al. | |
| 2016/0125086 | A1 * | 5/2016 | Markus | G06F 16/285 |
| | | | | 707/722 |
| 2016/0254957 | A1 * | 9/2016 | Maes | G06F 9/5072 |
| | | | | 709/223 |
| 2016/0366233 | A1 * | 12/2016 | Le | H04L 67/16 |
| 2018/0006881 | A1 * | 1/2018 | Anandam | H04L 41/0806 |
| 2018/0173526 | A1 * | 6/2018 | Prinsloo | G06F 8/77 |
| 2019/0028356 | A1 * | 1/2019 | Maes | G06F 9/5072 |
| 2019/0082004 | A1 * | 3/2019 | Bosch | H04L 67/10 |
| 2019/0097838 | A1 * | 3/2019 | Sahoo | H04L 12/4625 |

* cited by examiner

DISTRIBUTED LIFECYCLE MANAGEMENT FOR CLOUD PLATFORMS

BACKGROUND

Cloud platforms may be used to provide cloud services to clients. A cloud platform is formed by a cloud platform application being run on underlying hardware infrastructure. Cloud services include, for example, Software-as-a-Service (SaaS), Platform-as-a-Service (PaaS), Infrastructure as a Service (IaaS), and so on.

BRIEF DESCRIPTION OF THE DRAWINGS

FIGS. 2A-3C illustrate example cloud platforms at various stages of deployment. Specifically, FIG. 2A illustrates an initial deployment stage in which the nodes are in a ready state. FIG. 3C illustrates a sixth deployment stage in which the cloud platform includes N member nodes.

DETAILED DESCRIPTION

1—Definitions

Figure 1:
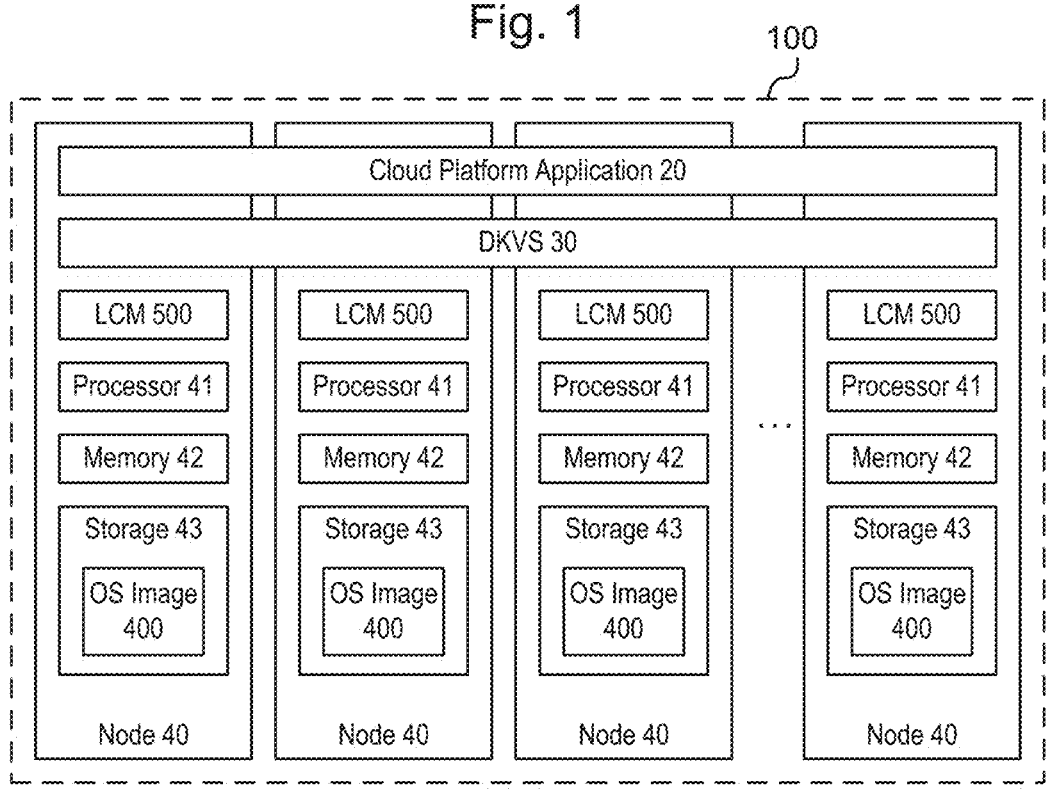
FIG. 1 illustrates an example of a deployed cloud platform.

Could Platform. As used herein, a cloud platform is a distributed computing system (computing cluster) that is to dynamically provide cloud services. The cloud platform is formed by a runtime instance of a cloud platform application and underlying hardware infrastructure.

Could Platform Application. As used herein, a cloud platform application is a distributed application for establishing and managing a cloud platform. As used herein, a distributed application is an application having components that can be run in a distributed manner on multiple nodes. Examples of commercially available cloud platform applications include Kubernetes, Mesos, and OpenStack.

Node. As used herein, a node is any computing device (virtualized or physical) that includes at least one processor (virtualized or physical) capable of executing program instructions stored on a non-transitory machine readable medium. A node may also include additional components (virtual or physical), such as memory (e.g., the aforementioned non-transitory machine readable medium), input/output units, controllers, peripherals, storage devices, etc. For example, a node may be a virtual machine (VM), a server, a blade of a blade server system, a compute module of a composable infrastructure appliance, a compute node of a converged (or hyperconverged) appliance, a compute node of a rack-scale system, a system-on-chip (SoC), a personal computer, a printed circuit board containing a processor, etc. It is possible for multiple distinct physical nodes to be housed in the same chassis, although this need not necessarily be the case. It is also possible for multiple distinct nodes to share some or all of their components—for example, virtual machines may be said to share the underlying physical hardware from which the virtual machines are virtualized.

Artifact. As used herein, an artifact is any piece of digital information that is part of or can be used by a computer program. Examples of artifacts include executable binary files, source files, scripts, tables, libraries, documents, and any other digital data.

Operating System Image. As used herein, an operating system image is an image (e.g., disk image) that includes artifacts to control operations of a node.

Services. As used herein, a service is a functionality or group of functionalities of a cloud platform. For example, services may include an API service, a domain name system service, a scheduler services, a distributed key value store service, a platform worker (aka slave or minion) service, and so on.

Role. As used herein, a role is a combination of services provided (or to be provided) by a node. Roles can be, but do not necessarily have to be, specified by a particular name. Roles may be, but do not necessarily have to be, associated with a configuration management script, such as an Ansible playbook.

2—Deploying, Maintaining, and Changing a Cloud Platform

Lifecycle management of a cloud platform refers to any one of (or any combination of) the functions of deploying, maintaining, and scaling a cloud platform. Deploying, maintaining, and scaling a cloud platform can be complicated and costly endeavors. In particular, many approaches to deploying, maintaining, and scaling a cloud platform, may require significant time and effort of an IT professional (or a team of professionals), which can result in high operation costs for the cloud platform. For example, in many approaches to deploying a cloud platform, an IT professional with knowledge of the particular cloud platform application being used may be needed to design the overall configuration of the system (e.g., determine which roles or services the system needs, determine which nodes should be assigned which roles/services, determine which software to install on which nodes, etc.), and then configure each node in the system. As another example, in many approaches, day-to-day maintenance tasks and failures require manual diagnosis and intervention by an IT professional. As another example, scaling the system after initial deployment is not supported in some approaches, or in other approaches is achieved via a manual reconfiguration of nodes by an IT professional.

Accordingly, disclosed herein are technologies that may simplify and reduce costs of deploying, maintaining, and scaling a cloud platform. For example, in examples described herein, a cloud platform may be deployed by providing intelligent nodes that are able to automatically self-assemble into the desired platform, maintain the platform, and dynamically scale up or down the platform, with minimal manual intervention and without centralized top-down control. The nodes may be "intelligent" in that, among other things, they each may include an example lifecycle management program ("LCM") that automatically works with the LCM's of the other nodes to cooperatively control the deployment, maintenance, and scaling of the cloud platform.

Specifically, in some examples, the cloud platform may be deployed by providing a set of the aforementioned intelligent nodes and instructing one of the nodes to begin self-assembling the platform. This first node may establish a cloud platform with itself as the sole member, and automatically invite the other nodes into the platform. As each node joins the platform, its LCM may automatically determine how the node should be configured to provide a best possible platform. In doing so, the LCMs of the nodes may coordinate with one another via a distributed decision making process, to ensure that a desired overall configuration of the platform is achieved. For example, the LCMs may identify which roles the platform currently needs based on a desired end-state (e.g., a specified fault tolerance) and the currently available resources, and may determine which nodes should play which roles. Each node may be provisioned from the outset with an image containing all of the artifacts needed to establish a full-fledged cloud platform, and therefore any of the nodes may be able to take on any needed role of the cloud platform. Each node's LCM may automatically configure its node to assume the role it has selected. Accordingly, the platform self assembles by starting with one initial member node and growing and configuring and reconfiguring itself as the other nodes join. Thus, in some examples, no manual intervention is needed to deploy the platform apart from providing the resources (e.g., the nodes) for the system and instructing one of the nodes to begin self-assembling the platform.

In addition, in some examples, once the cloud platform is deployed, the LCMs of the nodes may automatically perform maintenance for the platform, including, for example, identifying and performing periodic platform maintenance tasks, identifying and remediating failures, etc. For example, each node's LCM may monitor the status of the system, and, in response to a failure event (such as the failure of a service) that might require a remediation action (such as restarting the service on another node), the LCMs of the nodes may decide via distributed decision making which node should take the action. As another example, each node's LCM may monitor a platform maintenance task queue, and the LCMs of the nodes may decide via distributed decision making which node should perform which platform maintenance task. Thus, in some examples, no significant manual intervention is needed for such maintenance of the system.

Furthermore, in some examples, the system may be easily scaled up or down by adding or removing nodes from the system, with the LCMs of the nodes automatically determining how to configure (or reconfigure) the nodes in view of the changes. For example, each node's LCM may monitor for the addition or removal of a node from the system, and, in response to the removal or addition of a node, the LCMs of the nodes may decide via distributed decision making how to configure or reconfigure the nodes in view of the change. Thus, in some examples, no significant manual intervention is needed to scale the platform.

In examples described herein, the nodes form a cooperative system, in which control over the configuration of the system (both initial, and ongoing) is distributed among the nodes (via their LCMs). This is in contrast to an alternative approach, in which configuration of the nodes is controlled in a top-down manner by a master entity, such as a configuration management master. Furthermore, as mentioned above, the examples described herein provide for a system that is essentially self-deploying and self-sustaining, can dynamically scale up or down (from a single node to many nodes), and can tolerate the failure of any node and remediate those failures without outside intervention.

3—Example Cloud Platform

FIG. 1 illustrates an example cloud platform 100. The example cloud platform 100 is formed by a runtime instance of a cloud platform application 20, a distributed key value store (DKVS) 30, and a number of nodes 40. The nodes 40 are communicably connected to one another by communications media and network devices (virtual or physical) (not illustrated). The nodes 40 cooperate to instantiate the runtime instance of the cloud platform application 20 and the DKVS 30 by executing respective program instructions associated therewith.

The cloud platform application 20 is a distributed application for establishing a cloud platform (e.g., the cloud platform 100) from a set of resources (e.g., the nodes 40) and managing the platform. Because it is a distributed application, the cloud platform application 20 includes multiple components that can be executed in a distributed manner by multiple nodes 40 (however, this capability does not preclude the cloud platform application 20 from also being run entirely by a single node 40, as in the case of a cloud platform 100 with one member node 40). The distribution of components of the cloud platform application 20 across the nodes 40 is illustrated conceptually in FIG. 1 by the cloud platform application 20 spanning the nodes 40. The components of the cloud platform application 20 may include, for example, an API server, a domain name system service, a scheduler, a distributed key value store server (or proxy), a platform worker (aka slave or minion) service, etc. In a fully deployed platform 100, each component of the cloud platform application 20 is run by at least one of the nodes 40 that are part of the cloud platform 100, a component can be (but does not necessarily have to be) run by multiple nodes 40, and a node 40 can (but does not necessarily have to) run the same components as other nodes 40. Any cloud platform application may be used as the cloud platform application 20, including commercially available cloud platform applications such as Kubernetes, Mesos, and OpenStack.

The DKVS 30 is a logical storage volume in which the nodes 40 can store key-value pairs. The DKVS 30 is created and managed by a DKVS application (not illustrated) that is executed by the nodes 40. The DKVS 30 is backed by storage volumes, such as respective storage volumes 43 of the nodes 40 or storage volumes (not illustrated) external to the nodes 40 that are accessible to the nodes 40 over a network (not illustrated). The DKVS 30 may be used by the cloud platform 100 to, for example, store and communicate: platform configuration information, platform health/status information, and a platform maintenance task queue. Any DKVS application may be used to establish the DKVS 30, including commercially available DKVS applications, such as etcd.

The nodes 40 may each include a processor 41, a memory 42, a storage volume 43, a lifecycle manager ("LCM") 500, local components of the cloud platform application 20, and local components of a DKVS application. The LCM 500 of a given node 40 may be formed by the processor 41 of that node 40 executing LCM program instructions 501, which will be described below with reference to FIG. 8. As noted above, the processor 41 of a given node 40 may also execute program instructions of local components of the cloud platform application 20 and may execute program instructions of local components of the DKVS application.

More specifically, each node 40 is a computing device (virtualized or physical) that includes at least one processor 41 (virtualized or physical) capable of executing instructions stored on a non-transitory machine readable medium, such as memory 42 (virtualized or physical). The nodes 40 may also include a storage volume 43 (virtualized or physical) that may persistently store data for the node 40. The nodes 40 may also include additional components (virtual or physical), such as input/output units, controllers, peripherals, storage devices, etc. For example, a node 40 may be a virtual machine (VM), a server, a blade of a blade server system, a compute module of a composable infrastructure appliance, a compute node of a converged (or hyperconverged) appliance, a compute node of a rack-scale system, a system-on-chip (SoC), a personal computer, a printed circuit board containing a processor, etc. It is possible for multiple distinct physical nodes 40 to be housed in the same chassis, although this need not necessarily be the case. It is also possible for multiple distinct nodes 40 to share some or all of their components.

The processor 41 may include (or be virtualized from) any circuitry capable of executing machine-readable instructions, such as a central processing unit (CPU), a microprocessor, a microcontroller device, a digital signal processor (DSP), etc.

The memory 42 may include (or be virtualized from) any non-transitory machine-readable medium from which the processor 41 can read program instructions, including volatile media such as random-access-memory (RAM) (e.g., DRAM, SRAM, etc.) and/or persistent (non-volatile) media such as non-volatile RAM (NVRAM) (e.g., flash memory, Memristor RAM, Resistive RAM, Phase Change Memory, 3D XPoint memory, etc.).

The storage volume 43 may include (or be virtualized from) any storage device that is capable of persistently storing digital data, such as hard disk drives, solid state drives (e.g., flash drives), magnetic tape drives, optical disks, etc.

The nodes 40 may each be provisioned with a copy of an operating system image 400. The operating system image 400 may be stored, for example, in the storage volume 43. Each copy of the operating system image 400 may include at least all of the artifacts of the cloud platform application 20 that are needed to establish a desired cloud platform 100 of the cloud platform application 20 (referred to herein as "the minimum set of artifacts" for the cloud platform application 20). In other words, a single node 40 provisioned with the minimum set of artifacts would be able to establish a fully functional cloud platform 100 having itself as the sole member node 40. The artifacts may include, for example, executable binaries of the cloud platform application 20. The artifacts may also include, for example, files, libraries, and other data of the cloud platform application 20. The operating system image 400 may also include additional artifacts of the cloud platform application beyond the bare minimum needed to establish the cloud platform. In addition, in some examples, the operating system image 400 may include the LCM program instructions 501.

It should be understood that what constitutes the minimum set of artifacts for a cloud platform 100 depends on the type of cloud platform 100 that it is desired to establish. A cloud platform application 20 may be capable of establishing multiple different types of cloud platforms 100, and each may have its own minimum set of artifacts. An administrator or other management entity may determine a type of cloud platform 100 that is desired and hence which artifacts are needed for that cloud platform 100, for example as part of creating (or procuring) the operating system image 400.

In some examples, every software component of the cloud platform application 20 that is included in the operating system image 400 is included in an installed state, but may be quiesced until and unless it is needed. In some examples, a single cloud platform application 20 may be able to form multiple types of cloud platforms (e.g., a container based SaaS platform, a VM based PaaS/IaaS platform, etc.), in which case the operating system image 400 may include artifacts for one, multiple, or all of the types of cloud platforms that the cloud platform application 20 can establish.

For example, if the cloud platform application 20 is Kubernetes, then the minimum set of artifacts that are needed to establish one example type of Kubernetes container-based cloud platform includes: a Kubernetes API server component, a Kubernetes DNS component, a Kubernetes scheduler component, a Kubernetes Minion component, a container runtime interface component (e.g., Docker, runc, clear container, rkt), a registry component (e.g., Docker Registry), an overlay network component (e.g., flannel), and a computer operating system (e.g., a linux OS).

As another example, if the cloud platform application 20 is Mesos, then the minimum set of artifacts that are needed to establish one example type of Mesos container-based cloud platform includes: a mesos-master component, a mesos-agent component, a mesos-dns component, a scheduler component, a DKVS (e.g., zookeeper), a container runtime (e.g., Docker, runc, clear container, rkt), a java component, and a computer operating system (e.g., a linux OS).

As another example, if the cloud platform application 20 is OpenStack, then the minimum set of artifacts that are needed to establish one example type of OpenStack VM vending cloud platform includes: nova stack components (e.g., nova api, nova scheduler, nova compute, etc.), a cinder component, a neutron component, and a keystone component.

The above described approach for using the same operating system image 400 for all nodes 40 may be contrasted with an alternative approach, in which different components of a cloud platform application are provided on different nodes. For example, in most cloud platforms, different services of a cloud platform application are installed on different nodes (for example, different nodes may be provisioned with different operating system images depending on their intended role). In other words, in the alternative approach, while each component of the cloud platform application that is needed to establish a cloud platform is present somewhere in the system, not every node has every component. Thus, in contrast to the examples described herein, in such alternative approaches someone may need to spend time and effort in determining how many of each role is needed, which nodes should play which roles, and which components should be installed on which nodes.

As noted above, each node 40 includes an LCM 500, which may be formed by running the LCM program instructions 501. The LCM program instructions 501 may be stored in the node 40's storage volume 43 and loaded into the node 40's memory 42 for execution. In some examples, the LCM program instructions 501 are included in the operating system image 400 that is provisioned to each node 40, in addition to the minimum set of artifacts for the cloud platform application 20. The LCM 500 of each nodes controls the initial deployment, scaling, and maintenance of the cloud platform 100, as described in greater detail below.

As noted above, the nodes 40 may include some components (such as "processor", "memory", "storage volume", etc.) that may be physical or virtualized. Generally, for purposes of this disclosure, it does not matter whether the component(s) are physical or virtualized. Accordingly, any references herein and in the appended claims to any components of a node 40 that do not specify "physical" or "virtual" should be understood to admit both physical and virtualized types of the components (in any combination). However, any virtualized component of a node 40 is necessarily virtualized from underlying physical hardware. Accordingly, the recitation herein or in the appended claims of a given component of a node necessarily implies the presence somewhere in the system of physical hardware corresponding to the given component, with the given component either being one-and-the-same as the corresponding physical hardware or being virtualized from the corresponding physical hardware. Note that there is not necessarily a one-to-one ratio between physical hardware and the virtual components virtualized therefrom (one virtual component may span multiple physical components or multiple virtual components may share one physical component). Thus, for example, a recitation herein or in the appended claims such as "a system comprises a number of nodes that each include a processor" should be understood to mean at least that: (A) each node has either a physical processor or a virtual processor, and (B) if any nodes include a virtual processor, then the system includes at least one physical processor (not necessarily owned by any particular node) from which the virtual processor is virtualized.

4. Example Lifecycle Manager

The LCM 500 of a given node 40 may automatically work with the other LCMs 500 of the other nodes 40 to automatically control the initial deployment of a cloud platform 100, maintenance of the cloud platform 100, and/or scaling of the cloud platform 100. These functions are described separately below for ease of understanding, but it should be understood that in practice these may overlap and are not necessarily mutually exclusive. Example operations pertaining to these functions are described below, and some of these are illustrated as process flow charts in FIGS. 4-7. The LCM program instructions 501 include instructions that, when executed by a processor, cause the LCM 500 to perform the operations described below, including, for example, instructions corresponding to the operations shown in FIG. 4-7.

4.1 Initial Deployment of the Cloud Platform

The initial deployment of the cloud platform 100 begins by providing a number of nodes 40, each having a copy of the operating system image 400 and the LCM program instructions 501 (which may be part of the operating system image 400). The nodes 40 may be placed in a ready state by instantiating the LCM 500 of each node 40 (i.e., executing the LCM program instructions 501 on each node 40) and communicably connecting the nodes 40 to one another. Once in the ready state, one of the nodes 40 (hereinafter, "the first node 40-1") may be instructed to start a process of creating the cloud platform 100, whereupon the nodes 40 start to self-assemble into the cloud platform 100.

Figure 2A:
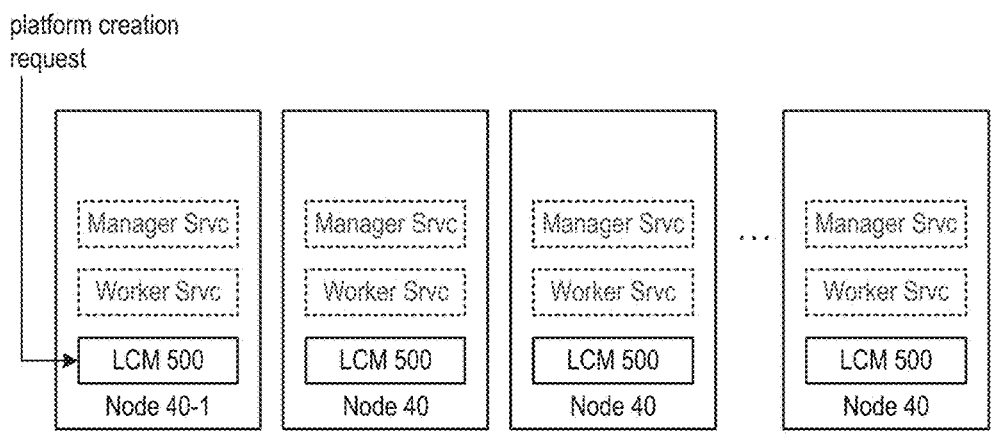

When the nodes 40 are in the ready state, a platform creation request is sent to the LCM 500 of the first node 40-1 (see FIG. 2A). In response, the first node 40-1 begins the self-assembly of the cloud platform 100, for example by executing operations such as those illustrated in FIG. 4. Specifically, the process illustrated in FIG. 4 may be performed by the LCM 500 of the first node 40-1 (i.e., the node 40 that receives a platform creation request).

Figure 4:
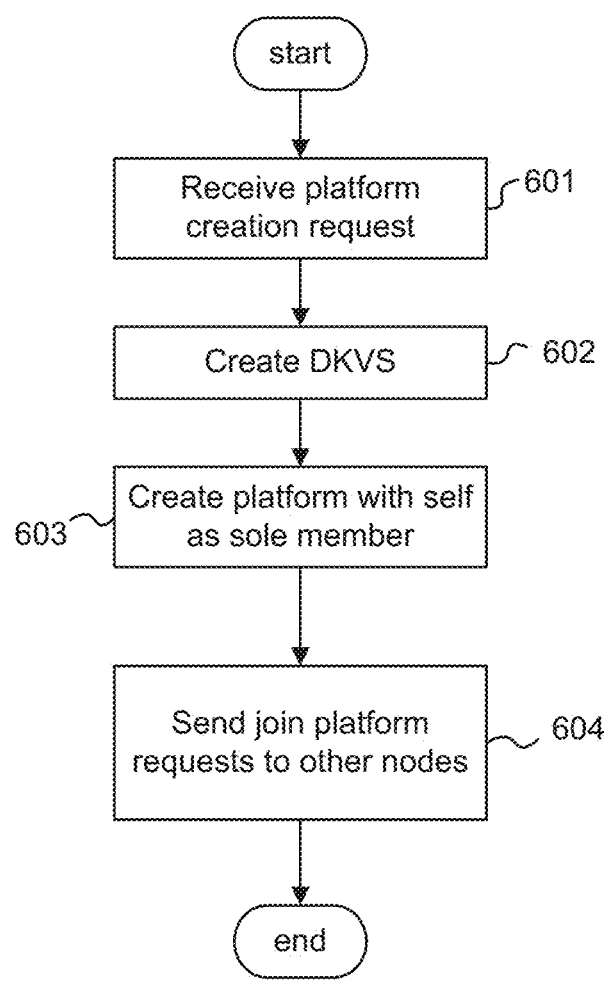
FIG. 4 is a process flow diagram illustrating an example process for initial setup of a platform setup.

FIG. 4 will now be described. In block 601, LCM 500 receives a platform creation request, for example from an administrator or other management entity. The platform creation request includes at least an instruction to begin deployment of the cloud platform 100. The platform creation request may also include an identification of a resource envelope for the cloud platform 100, such as, for example, an identification of the other nodes 40 that are to be part of the cloud platform 100. The platform creation request may also include some general platform-wide parameters, such as a target fault tolerance level. In some examples, it does not matter which one of the nodes 40 is chosen to receive the platform creation request, since any one of the nodes 40 may be capable of handing the request (recall that all of the nodes 40 may be provisioned with the same operating system image 400 including the LCM program instructions 501).

In response to receiving the platform creation request, in block 602 the LCM 500 creates the DKVS 30. For example, if using etcd as the DKVS 30, the first node 40-1 may establish an etcd cluster with itself as the sole member.

Figure 2B:
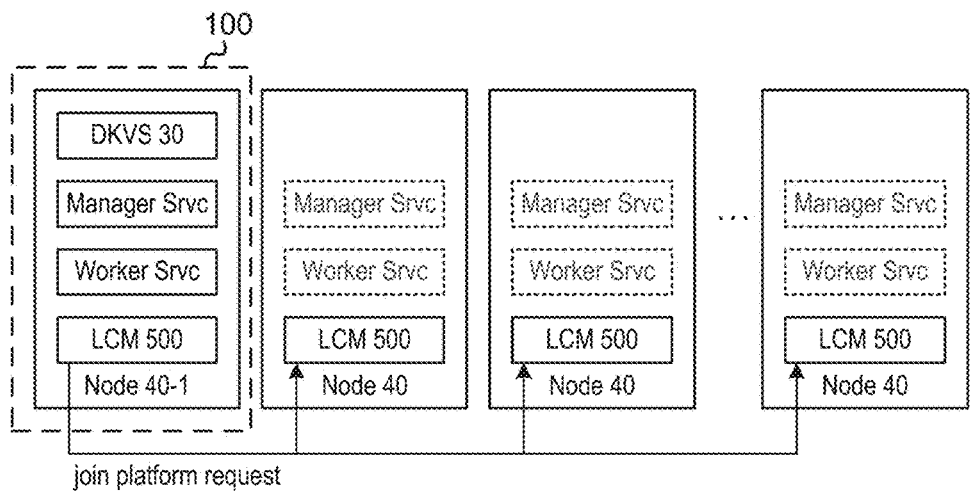
FIG. 2B illustrates a second deployment stage, in which the cloud platform has one member node.

In block 603, the LCM 500 creates the cloud platform 100 with itself as the sole member (see also FIG. 2B). For example, the LCM 500 of the first node 40-1 may establish the cloud platform 100 by automatically activating (unquiescing) all of the local components of the cloud platform application 20 needed for establishing the cloud platform 100 and running local configuration scripts to automatically configure itself to take on all of the needed roles of the cloud platform 100.

In block 604, after establishing the cloud platform 100, the first node 40-1 starts to invite the other nodes 40 that are supposed to be part of the cloud platform 100 (as identified, for example, in the platform creation request) to join the platform 100. In particular, the first node 40-1 sends join platform requests to each of the nodes 40 that are supposed to be part of the cloud platform 100 (see FIG. 2B). The join platform requests may include information needed for the nodes 40 to be able to join the cloud platform 100, such as, for example, an identification of the DKVS 30 that the first node 40-1 created and credentials for joining the DKVS 30 (if needed). Once the other nodes 40 are part of the DKVS 30, they may have access to platform configuration information stored therein, which may be used by the nodes 40 to join the cloud platform 100. Additional details regarding these operations are described below.

Figure 5:
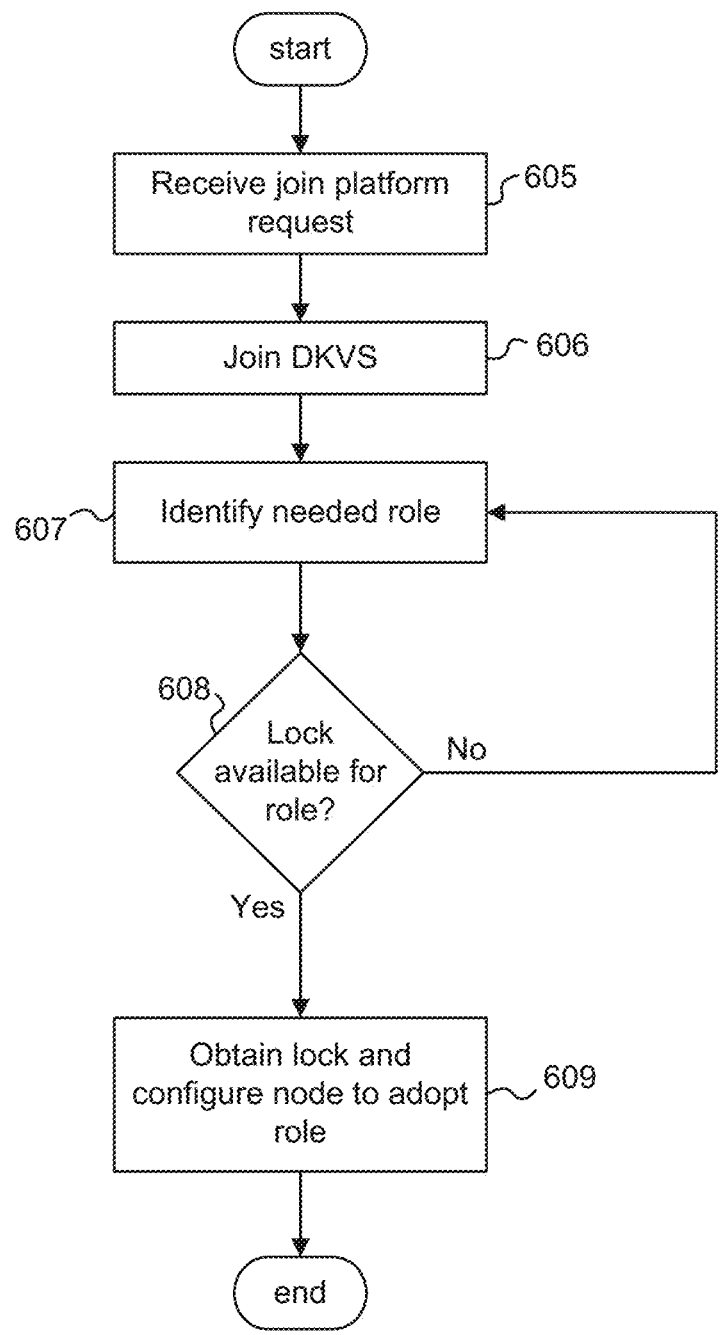
FIG. 5 is a process flow diagram illustrating an example process for integrating into a cloud platform.
Figure 6:
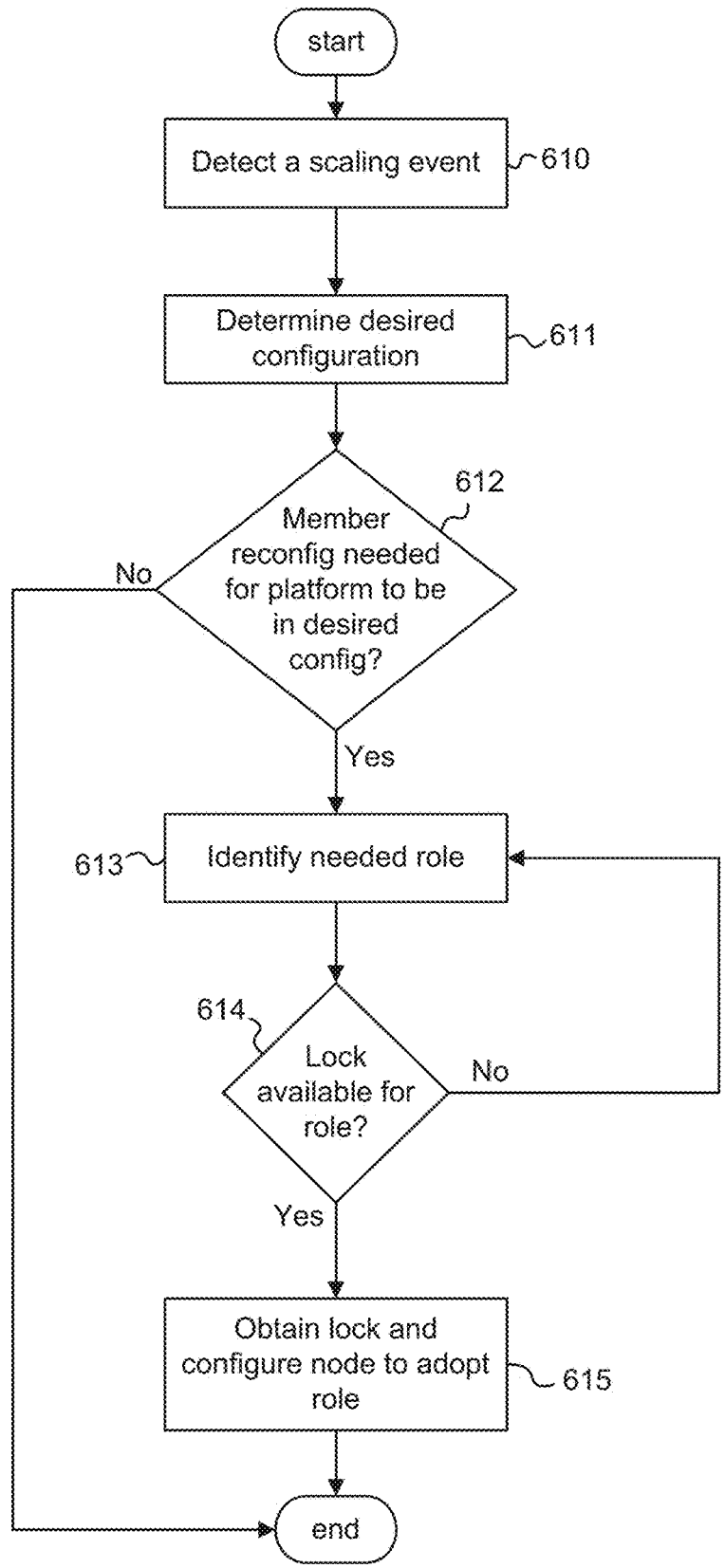
FIG. 6 is a process flow diagram illustrating an example process for responding to a scaling event.

When one of the nodes 40 receives a join platform request, the LCM 500 of the node 40 may automatically begin a process to integrate itself into the existing cloud platform 100 (i.e., join the platform 100 and configure itself to adopt a role therein), for example by executing operations such as those illustrated in FIG. 5. Specifically, the process illustrated in FIG. 5 may be performed by the LCM 500 of any node 40 that is not yet a member of the platform 100 that receives a join platform request.

FIG. 5 will now be described. In block 605, the LCM 500 receives the join platform request.

In block 606, in response to the join platform request the LCM 500 joins the DKVS 30 established by the first node 40-1.

Once a node 40 has joined the DKVS 30, the LCM 500 of the node 40 may then obtain current platform configuration and status information from DKVS 30, and the LCM 500 may determine how it should configure its node 40 as part of joining the platform 100 in blocks 607-609

In particular, in block 607, the LCM 500 identifies a role that it thinks its node 40 should adopt in the cloud platform 100. For example, the LCM 500 may identify, based on the current state of the platform 100 (as determined from the DKVS 30) and a desired configuration for the platform 100, which role the node 40 should be configured to adopt so as to most improve the state of the cloud platform 100. Additional details of how a node 40 may identify such a role for itself are described below.

In determining the role it should adopt, the LCM 500 uses the DKVS 30 to coordinate with the other nodes 40 that are already members of the platform 100 and/or other nodes 40 that are seeking to join the platform. For example, in block 608, the LCM 500 determines whether a lock in the DKVS 30 is available for the role, and adopts the role only if the lock is available. If the lock is not available, the LCM 500 returns to block 607 to identify another role to perform. In some examples, the LCM 500 may wait a predetermined amount of time before identifying another role to perform.

In block 609, the LCM 500 obtains a lock for the role and then configures itself to adopt the role. For example, the LCM 500 may automatically configure the node 40 to assume the identified role, for example by running local configuration scripts to activate and configure the services appropriate to the role (See FIG. 2C).

As nodes 40 newly join the platform 100, existing member nodes 40 of the platform 100 may be aware of these events and may determine whether and how they should reconfigure themselves in view of the new members. The process of an existing member node 40 determining whether and how to reconfigure itself is described in greater detail below in relation to scaling.

Thus, the platform 100 begins with a single member—the first node 40-1—and then grows as the other nodes 40 automatically integrate themselves into the platform 100. As nodes 40 continue to join the cloud platform 100, they may each automatically determine how they should be configured based on the configuration of the other nodes 40. Existing members of the platform 100 may also automatically reconfigure themselves if needed. Thus, the platform-level configuration of the cloud platform 100 may be automatically changed and updated as individual nodes 40 join the platform 100, with the nodes 40 themselves determining how they should be configured.

In both cases of newly joining nodes 40 and existing nodes 40 reconfiguring themselves, the LCMs 500 of the nodes 40 may use the DKVS 30 to obtain configuration information of other nodes 40, share their own current and/or intended configuration, and otherwise coordinate their actions with the other nodes 40. For example, a distributed locking mechanism of the DKVS 30 may be used by a node 40 to reserve available roles, services, or actions. Thus, the DKVS 30 may act as a distributed decision making mechanism, allowing the individual nodes 40 to be independently in control of configuring themselves while also coordinating with one another to achieve a desired system-wide configuration.

Figure 2C:
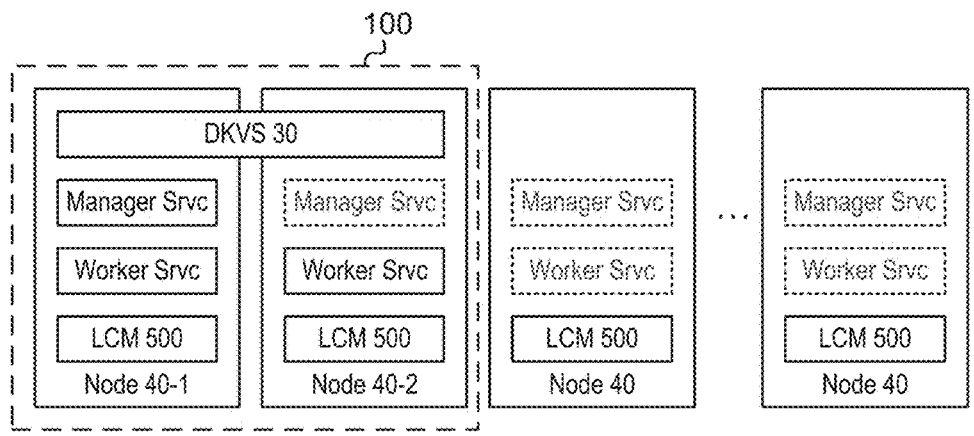
FIG. 2C illustrates a third deployment stage, in which a second member node has been integrated into the cloud platform.
Figure 3A:
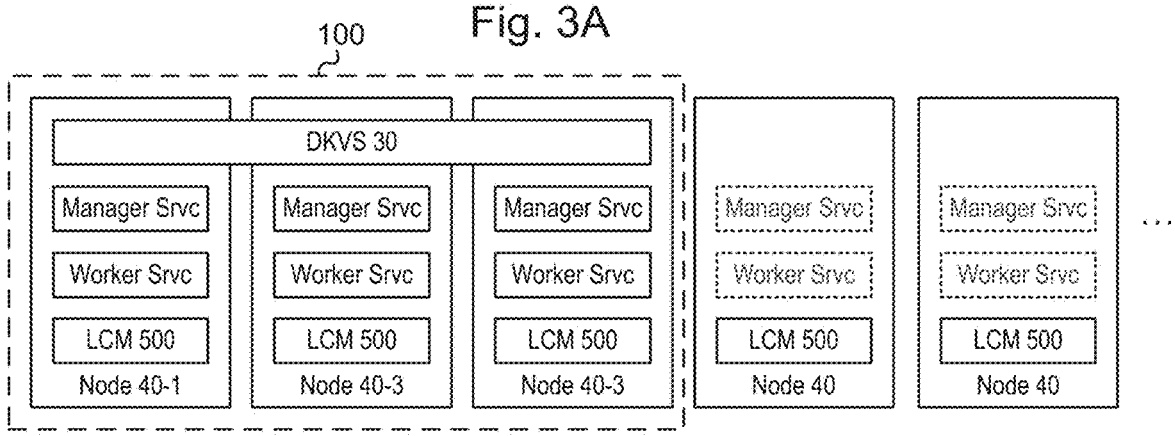
FIG. 3A illustrates fourth deployment stage in which the cloud platform includes three member nodes.
Figure 3B:
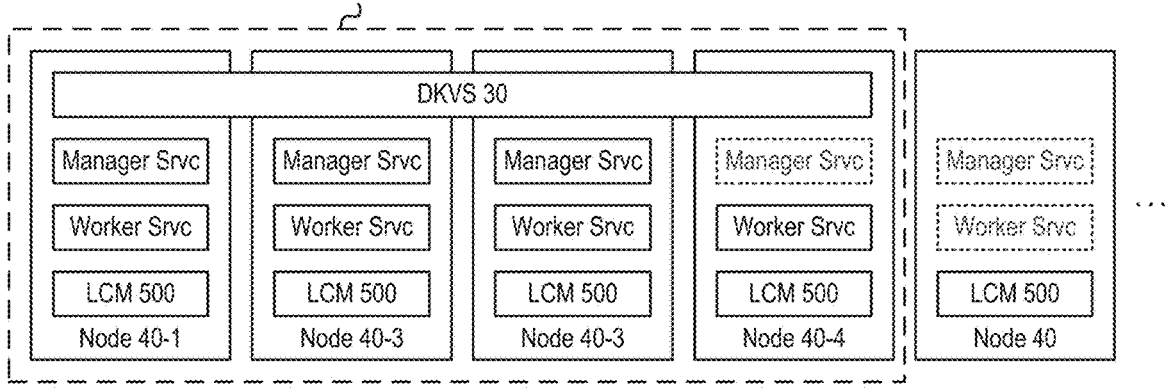
FIG. 3B illustrates a fifth deployment stage in which the cloud platform includes more than three member nodes.
Figure 3C:
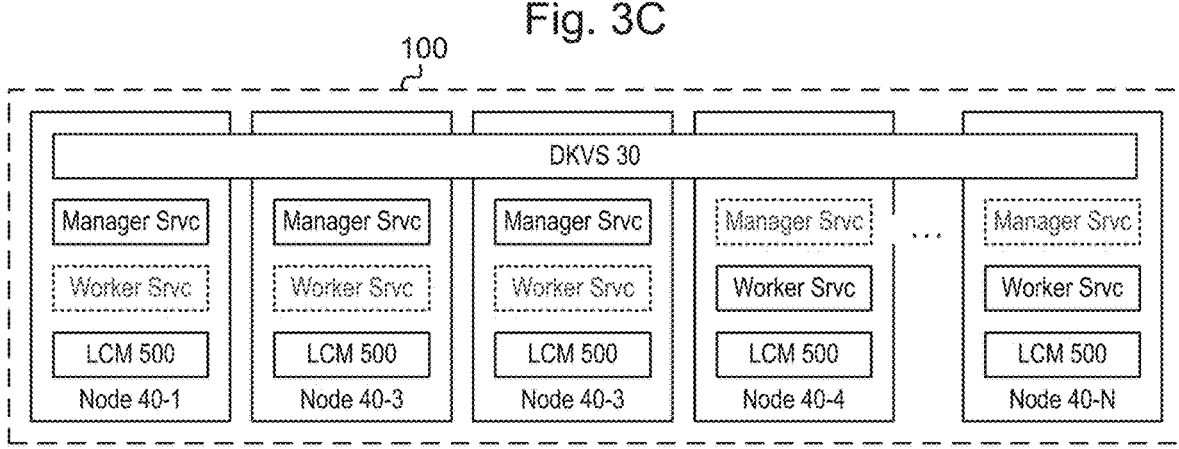

For example, consider FIGS. 2A-3C, which illustrate example stages of the nodes 40 self-assembling into an example of the cloud platform 100. Although there is not necessarily a limit on the number of roles/services in a cloud platform 100, for ease of description and understanding FIGS. 2 and 3 illustrate services associated with three roles: hybrid manager-worker, manger-only, and worker-only. A hybrid manager-worker node 40 will have activated both services associated with a manager (hereinafter "manager services") and services associated with a worker (hereinafter "worker services"). A manger-only node 40 will have activated manager services but not worker services. A worker-only node 40 will have activated worker services but not manager services. In FIGS. 2 and 3, manager services are represented by boxes labeled "Manager Srvc" while worker services are represented by boxes labeled "Worker Srvc". In the Figures, services that are not activated on a node 40 (e.g., installed but quiesced services) are represented by boxes that have dashed lines, while services that are activated are represented by boxes that have solid lines and no shading.

In FIG. 2A, a number of nodes 40 are provided that are to form the platform 100. In the stage illustrated in FIG. 2A, each node 40 has a running instance of the LCM 500 and the same components of the cloud platform application 20 (e.g., Manager Srvc and Worker Srvc), which are all quiesced. In this state, the first node 40-1 is provided the platform creation request, for example by a system administrator.

In FIG. 2B, in response to the platform creation request, the first node 40-1 creates the platform 100 and DKVS 30 having itself as sole member. Because the first node 40-1 is the sole member of the platform 100 at this point, it initially takes on all of the needed roles/services of the platform 100, which in this example means becoming a hybrid manager-worker. The first node 40-1 then sends the join platform request to the other nodes 40.

In FIG. 2C, the second node 40-2 integrates itself into the system. The second node 40-2 may determine that a desired configuration for the platform 100 in this state is for the platform 100 to have one hybrid manager-worker node 40 and one worker-only node 40. Based on the desired platform-level configuration and the fact that there is already one hybrid manager-worker node 40 in the platform 100, the second node 40-2 may determine that it should configure itself to be a worker-only node 40. Thus, the second node 40-2 activates and configures the services associated with a worker role.

In FIG. 3A, a third node 40-3 joins the cloud platform 100. The third-node 40-3 may determine that a desired platform-level configuration for the platform 100 in this state is to have three hybrid manager-worker nodes 40 (e.g., to provide high availability). Based on this desired configuration, the third node 40-3 may determine that it should become a hybrid manager-worker, since this will improve the platform 100 by bringing the platform 100 closer to the desired configuration. In response, the second node 40-2 may also decide to reconfigure itself to become a hybrid manager-worker, to further improve the platform 100 by bringing the platform 100 fully into the desired configuration.

In FIG. 3B, a fourth node 40-4 joins the platform 100. The fourth node 40-4 may determine that a desired platform-level configuration for the platform 100 in this state is to have three hybrid manager-worker nodes 40 and one worker-only node 40 (e.g., to provide high availability). Based on this desired configuration, the fourth node 40-4 may determine that it should become a worker-only, since this will improve the platform 100 by bringing the platform 100 closer to the desired configuration.

The remaining nodes 40 may continue to join the platform 100, with each deciding how it should be configured, until all of the nodes 40 have become members of the platform. In some examples, the fourth and subsequent nodes 40 may join as worker-only nodes 40. In some examples, as illustrated in FIG. 3C, when the platform becomes large enough (e.g., the number of nodes 40 exceeds some threshold) or busy enough (e.g., a usage metric exceeds some threshold), the hybrid manger-worker nodes 40 may be reconfigured to manager-only roles, as the management duties of these nodes 40 may be significant enough at this point to diminish their ability to also provide worker services.

4.2 Scaling of the Cloud Platform

Scaling of the cloud platform 100 means adding nodes 40 to or removing nodes 40 from the cloud platform 100. A portion of the initial deployment of the platform 100 includes a scaling process, because during initial deployment, the platform 100 scales from one initial member to eventually include all of the originally deployed nodes 40. However, scaling can also occur after initial deployment, as new nodes 40 are added beyond those initially deployed. In addition, scaling also covers the removal of nodes 40 from the platform 100, which generally does not occur as part of initial deployment. Hereinafter, a node being added to (or attempting to join) the platform 100 and a node 40 being removed from (or attempting to leave) the platform 100 are referred to generally as "scaling events" when it is not important to distinguish between them.

To add a node 40 to (or integrate a node 40 into) the platform 100, the node 40 must first be provisioned, for example by an administrator or other management entity, with the provisioned node 40 having an instance of the LCM 500 running thereon and a copy of the operating system image 400. Once the node 40 has been provisioned, the rest of the process of adding the node 40 into the platform may be handled automatically by the nodes 40 with no or very minimal manual intervention. For the new node 40 to be able to join the platform 100, the new node 40 and/or the current member nodes 40 need to be made aware of one another. In some examples, this may be accomplished automatically; for example, the platform 100 may have a periodic maintenance task to check for updates to its resource envelope (e.g., new nodes 40), which may reveal the presence of the new node 40. In other examples, the administrator or other management entity may send a message to the platform 100 to notify it of the new node 40. In response to detecting the presence of a new node 40, one of the member nodes 40 may send the new node 40 a join platform request, just like the join platform requests that were described above in relation to initial deployment. In response to the join platform request, the new node 40 may then attempt to join the platform 100 in the same manner as a node 40 would join the platform during initial deployment and as described in greater detail below.

Removing a node 40 from the platform may occur in many ways, including intentionally and accidentally. For example, a node 40 may be removed from the platform by an administrator or other management entity sending a command to the to-be-removed node 40 and/or to the other nodes 40 of the platform indicating that the to-be-removed node 40 is to be removed from the resource envelope of the platform 100 (hereinafter, "graceful removal"). In response to such a message, the remaining nodes 40 of the platform 100 may enact processes to handle the removal of the node 40, including, for example, determining whether any of the remaining nodes 40 need to reconfigure themselves, transferring load from the to-be-removed node 40 to other nodes, and so on. As another example, a node 40 may be removed from the platform 100 without necessarily notifying the other nodes 40 in advance. For example, the node 40 may be suddenly shut down (intentionally or by a failure). As another example, the node 40 may experience a failure or error that, while not shutting down the node 40 completely, prevents the node from functioning as a platform 100 member. As another example, the node 40 may be suddenly disconnecting from the other nodes 40 (intentionally or by a failure).

When a scaling event occurs, this may have important implications for both the node 40 that is the subject of the scaling event and the other nodes 40 that are members of the platform 100. In particular, a node 40 that is to be added to the platform 100 may need to automatically configure itself as part of integrating into the platform 100, as described in greater detail below. In addition, existing member nodes 40 of the platform 100 that are not the subject of the scaling event may also need to reconfigure themselves in view of the scaling event. In particular, when a node 40 newly joins or leaves the platform 100, this may bring the platform 100 into a state in which its current configuration is not the desired configuration, and therefore one or more existing members of the platform 100 may need to reconfigure itself in order to bring the platform 100 as a whole into (or closer to) the desired configuration.

Accordingly, the nodes 40 that are currently members of the platform 100 need to be aware of such scaling events, so that they can determine whether, and if so how, they should reconfigure themselves. Thus, in some examples the LCM 500 of each node 40 in the platform 100 may be configured to monitor for the addition or removal of nodes 40. Specifically, the LCM 500 of each node 40 that is a member of the platform 100 may be configured to automatically monitor the status (e.g., health and configuration) of the platform 100, including monitoring which nodes 40 are members of the platform 100 (and their health status) and which nodes 40 are attempting to join the platform 100. The LCM 500 may find this information, for example, in the DKVS 30. The LCM 500 may also take other active steps to ascertain this information, such as exchanging messages with other nodes 40. Based on the status information, the LCM 500 of each node 40 in the platform 100 may be configured to detect when nodes 40 join or leave platform 100. In response to detecting such an event, each member node 40 may determine whether it needs to reconfigure itself to account for the change.

In some examples, all of the nodes 40 monitor for scaling events concurrently. In other examples, monitoring for scaling events is a periodic maintenance task that is performed by one node 40 at a time. In some examples, different types of scaling events may be monitored in different ways; for example, the adding of a node 40 and the graceful removal of a node 40 may be monitored as period maintenance tasks performed by one node 40 at a time, while sudden failure of a node 40 (e.g., shut down, disconnection, or other failure) may be monitored for by all nodes 40 concurrently.

4.2.1—Configuration of Nodes in Response to Scaling Events

As noted above, when a scaling event occurs, both the node 40 that is the subject of the scaling event and the member nodes 40 of the platform may need to configure themselves. In particular, when a node 40 newly joins (or attempts to join) the platform 100 (whether as part of initial deployment, or subsequent to deployment), the newly joining node 40 automatically configures itself, as described in greater detail below. In addition, existing members of the platform 100 may or may not need to reconfigure themselves in view of the newly joining node 40, depending on the current configuration of the platform 100. When a node 40 leaves the platform 40, the leaving node 40 does not necessarily need to do any configuration (it may be, for example, simply shut down), but the existing members of the platform 100 may or may not need to reconfigure themselves in view of the changed number of nodes 40 in the platform 100.

As describe above in relation to FIG. 5, the LCM 500 of a node 40 that is newly joining the platform 100 may determine how to configure itself based on its identification of a role that it should play in the platform 100. For example, the LCM 500 of the joining node 40 may identify the role to adopt based on what would improve the platform 100 in view of its current configuration. For example, the LCM 500 of the joining node 40 may identify a desired configuration of the platform 100 as a whole in view of current conditions, and select a role that will bring the platform 100 into (or closer to) the desired configuration. In particular, the LCM 500 of the joining node 40 may identify a desired configuration of a platform that has a number of nodes 40 equaling the sum of the nodes 40 currently in the platform 100 plus the joining node 40 plus (in some examples) other concurrently joining nodes 40. As used herein, a desired configuration of the platform 100 is a specification of per-node 40 roles to be included in the platform 100 based on a number of nodes 40, without necessarily specifying which particular nodes 40 adopt which particular roles. For example, a desired configuration of the platform 100 may be "one hybrid manager-worker node 40" for a one-node platform 100, "one hybrid manager-worker node 40 and one worker-only node" for a two-node platform 100, "three hybrid manager-worker nodes 40" for a three-node 40 platform 100, and so on (see Table 1 below for further examples). The LCM 500 of the joining node 40 may identify one of the roles in the identified desired configuration of the platform 100 as the role it will adopt. In some examples, the LCM 500 of the joining node 40 may attempt, when possible, to adopt one of roles of the desired configuration that is not yet provided by the member nodes 40 of the platform 100.

The process for a current member node 40 of the platform 100 to determine whether, and if so how, it should reconfigure itself in response to a scaling event may be similar to how a newly joining node 40 determines how to configure itself. For example, the LCM 500 of a current member node 40 may execute operations such as those illustrated in FIG. 6.

In block 610, the current member node 40 detects a scaling event, such as the addition or removal of a node 40 to/from the platform 100. For example, the LCM 500 of each node 40 may detect that a node 40 has newly joined (or is attempting to newly join) the platform 100 or that a node 40 has been removed (or is going to be removed) from the platform 100 by monitoring the DKVS 30. As another example, the member nodes 40 of the platform 100 may monitor the status (e.g., health, connectivity, etc.) of other member nodes 40 so that they can detect the removal of a node 40. In some examples, the member nodes 40 of the platform 100 may detect the scaling event while the scaling event is ongoing (e.g., while a node 40 is in the process of joining the platform 100). In other examples, the member nodes 40 of the platform 100 may detect the scaling event after the scaling event has finished (for example, as part of a periodic maintenance task).

In blocks 611-615, the LCM 500 of the member node 40 determines whether it should reconfigure itself in response to the scaling event, and if so how. In some examples, the member nodes 40 of the platform 100 may determine whether/how they should reconfigure themselves while the scaling event is ongoing—for example, current member nodes 40 and joining nodes 40 may configure/reconfigure themselves concurrently. In other examples, the member nodes 40 of the platform 100 may determine whether/how they should reconfigure themselves after the scaling event has finished—for example, joining nodes 40 may configure themselves first, and then after this the current member nodes 40 may determine whether any reconfiguration is needed.

In particular, in block 611, the LCM 500 determines a desired configuration for the platform 100 in view of the number of nodes 40 that will be members of the platform 100 as a result of the scaling event. More specifically, in examples in which block 611 is performed after the scaling event is finished, then the desired configuration is based on the total number of nodes 40 currently in the platform 100 (which would automatically include any nodes 40 that joined as part of the scaling event and exclude any nodes 40 that left as part of the scaling event). In examples in which block 611 is performed while the scaling event is ongoing, then the desired configuration is based on the total number of nodes 40 currently in the platform 100 plus any joining nodes 40 and minus any leaving nodes 40. Because each node 40's LCM 500 has the same logic, each LCM 500 will identify the same desired configuration given the current state of the platform 100. More detailed examples of how a desired configuration may be determined are described below.

In block 612, the LCM 500 may determine whether any current member node 40 of the platform 100 would need to be reconfigured in order for the platform 100 to be in the desired configuration after the scaling event. For example, the configuration of current member nodes 40 may be compared to the desired configuration to identify any differences between them. If there are no differences between the desired configuration and the current platform 100 configuration, then no reconfiguration of member nodes 40 is needed. If the current platform 100 configuration is a subset of the desired configuration (i.e., the current configuring is missing one or more roles but there are no extraneous roles in the current configuration, relative to the desired configuration) then no reconfiguration of member nodes 40 is needed, since the newly joining nodes 40 may be able to fulfill the missing roles. If the current platform configuration includes extraneous roles, then reconfiguration of member nodes 40 is needed to remove the extraneous roles (and also fill a missing role).

In some examples, it can be determined in advance which state transitions of the platform 100 the LCM 500 would require reconfiguration of member nodes 40 and which would not. For example, assuming the example desired configurations of Table 1 (described below), then reconfiguration of member nodes is only required when the number of nodes 40 in the platform 100 transitions from two or less to three or more and vice versa, or when the number of nodes 40 transitions from X−1 or less to X or more and vice versa, where X is a specified threshold. In such examples, the LCM 500 may determine whether reconfiguration of member nodes 40 is required simply by determining whether the state transition that has occurred (or is occurring) as a result of the scaling event is one of a list of specified state transitions that require reconfiguration.

In block 612, in some examples, the process continues to block 613 if at least one member node 40—any node 40—would need to be reconfigured; if no member nodes 40 would need to be reconfigured, then the process may end and the member node 40 may keep its current configuration. In other examples, the process continues to block 613 if one of the extraneous roles in the current configuration of the platform matches the current role of the member node 40 of the LCM 500 performing the process; otherwise the process ends for that node 40.

In block 613, the LCM 500 identifies a needed role for its node 40. In particular, the LCM 500 of each member node 40 may identify one of the roles specified in the desired configuration as the role it will adopt.

To ensure that the desired configuration is adopted in the platform 100 in response to a scaling event, the nodes 40 may coordinate with one another via the DKVS 30 in their selection of roles. For example, the nodes 40 may use a distributed locking mechanism of the DKVS 30 to distribute the roles amongst themselves. For example, each type of role (e.g., hybrid manager-worker, manager-only, worker-only, etc.) may be allocated a specific number of locks in the distributed locking mechanism corresponding to the number of that type of role that is specified in the desired configuration. In such an example, a node 40 must first reserve a lock for a role before configuring itself to adopt the role, and may not adopt a role for which it has not reserved a lock. Thus, in this example, each current member node 40 and each newly joining node 40 (if any) may select its role by reserving a lock associated with that role. This may ensure that all of the roles of the desired configuration are ultimately filled.

Accordingly, in block 614 the LCM 500 may attempt to obtain a lock for the role it has selected, and in so doing the LCM 500 determines whether or not the lock is available. If the lock is available, then the process continues to block 615. If the lock is not available, then the process loops back to block 613, where the node 40 selects another role for which it can attempt to obtain a lock. In some examples, the LCM 500 may wait a predetermined amount of time before returning to block 613. For example, if there are five worker-only roles in the desired configuration, and four nodes 40 have already obtained locks for worker-only roles, then a next (fifth) node 40 to try to obtain a lock for the worker-only role would find the lock available while a following (sixth) node 40 to try to obtain a lock for the worker-only role would find the lock unavailable. In some examples, nodes 40 that are not participating in reconfiguration (e.g., nodes 40 that answered "No" in block 612) may automatically obtain (or keep, if they already have it) a lock for their current role before other nodes 40 attempt to lock in roles, while nodes 40 that are participating in reconfiguration (e.g., nodes 40 that answered "Yes" in block 612) may relinquish any lock on their current role before the nodes 40 attempt to lock in new roles.

In some examples, current member nodes 40 may be biased to seek to keep their currently configured roles if the role is one that is found in the desired configuration and if a lock is available for it. In other words, a current member node 40 may first attempt to reserve a lock for its currently configured role, and may consider other roles only when there are no locks remaining for its current role. This may help to reduce unnecessary changing of roles among member nodes 40, which may affect performance of the platform 100. In addition, in some examples in which member nodes 40 determine whether/how to reconfigure themselves concurrently with joining nodes 40 determining how to configure themselves, current member nodes 40 may be given priority over newly joining nodes 40 in reserving locks (e.g., all member nodes 40 select their locks before joining nodes 40 are allowed to select locks), which may help to prevent newly joining nodes 40 from unnecessarily forcing a current member node 40 to change roles.

In block 615, the node 40 obtains the available lock for the role, whereupon the node 40 starts a process of automatically reconfiguring itself to adopt the role, for example by executing automated configuration scripts associated with the role.

Although the description above occasionally focuses on examples in which a single node 40 is joining or leaving the platform 100 at a time, it should be understood that, in some examples, multiple nodes 40 may join or leave the platform 100 at the same time. In particular, in determining the desired configuration for the platform 100 as part of determining what role to adopt, each node 40 may consider not just itself and the current member nodes 40, but also all of the nodes 40 that are concurrently joining the platform 100. For example, if two nodes 40 are currently members of the platform and two more nodes 40 are trying to join the platform simultaneously, all of these nodes 40 may determine a four-node desired configuration (two current members plus two joining).

4.2.2—Desired Configurations of the Platform

As described above, in some examples the LCM 500 may need to determine a desired configuration of the cloud platform 100 as part of determining how to configure or reconfigure itself. In such examples, the desired configuration of the cloud platform 100 may depend on the number of nodes 40 that are or will be in the platform 100 as a result of a scaling event. For example, a one-node 40 desired configuration differs from a two-node desired configuration, which differs from a three-node 40 desired configuration, and so on. In some examples, the desired configuration of the cloud platform 100 further depends on platform 100 wide parameters, such as a desired fault tolerance. For example, a three-node 40 desired configuration with a specified fault tolerance of one node may differ from a three-node 40 desired configuration with no specified fault tolerance.

In some examples, each LCM 500 may identify a desired configuration by searching a list of pre-specified desired configurations. The list may be included in the LCM program instructions 501 of each node 40, and may be indexed (i.e., keyed) at least based on a number of nodes 40. In other examples, the LCM 500 of each node 40 may include logic for determining desired configurations on-the-fly based at least on a number of nodes 40.

In examples in which the LCM program instructions 501 include a list (or lists) of pre-specific desired configurations, the list may take any form, such as tables, arrays, associative lists, key-value stores, etc. As noted above, the list may be indexed at least by a number of nodes 40. For example, the LCM 500 may search such a list to find the desired configuration that is associated with a node number equal to the number of nodes 40 currently in the platform 100 plus any nodes 40 currently attempting to join the platform 100 minus any nodes 40 currently attempting to leave the platform 100. In addition, the list may also be indexed by specified platform-wide configuration parameters (such as a target fault tolerance), and/or any other parameter. In examples in which the indexing includes specified target platform configuration parameters, these may be specified, for example, to the first node 40-1 in the platform creation request, and the first node 40-1 may record this information in the DKVS 30 from which subsequent nodes 40 may obtain the information.

Table 1 illustrates one possible example of a list of desired configurations for the platform 100 indexed by the number of nodes. In the example list of Table 1, it is assumed that it is desired to have high availability with a fault tolerance of one (for example, this may be specified as a target configuration parameter), and that therefore having at least three manager roles is desired when possible. In the example list of Table 1, it is also assumed that it is desirable to have a lowest number of manager roles, subject to the aforementioned constraint of maintaining high availability if possible. In the example list of Table 1, it is also assumed that it is desirable to have nodes 40 that perform manager services also perform worker services (i.e., be hybrid manager-workers) until a size of the system becomes too large (e.g., the number of nodes 40 exceeds a specified threshold number of nodes 40, denoted X in the Table) (see also FIG. 3C).

TABLE 1

| Number of Nodes | Hybrid Manager-Workers | Workers-only | Managers-only |
|---|---|---|---|
| 1 | 1 | 0 | 0 |
| 2 | 1 | 1 | 0 |
| 3 | 3 | 0 | 0 |
| 4 | 3 | 1 | 0 |
| 5 | 3 | 2 | 0 |
| 6 | 3 | 3 | 0 |
| . | . | . | . |
| . | . | . | . |
| . | . | . | . |
| X − 1 | 3 | X − 4 | 0 |
| X | 0 | X − 3 | 3 |
| X + 1 | 0 | X − 2 | 3 |
| . | . | . | . |
| . | . | . | . |
| . | . | . | . |

In examples in which the LCM 500 of each node 40 determines desired configurations on-the-fly rather than by consulting a pre-specified list, the LCM 500 may include logic for making such determinations. The logic may include specified rules that may be applied in view of input parameters, such as a number of nodes 40, to derive a desired configuration of the platform 100. For example, the logic may include a rule to include just one manager role when high availability is not required or is not possible. As another example, the logic may include a rule to include exactly the minimum number of manager roles that are necessary for high availability when high availability is specified and possible. As another example, the logic may include a rule to always have manager services be implemented in hybrid manager-worker nodes 40 until a size of the platform 100 cross a specified threshold (e.g., the number of nodes meets/exceeds a threshold X), or until a performance of the manager nodes 40 drops below a specified threshold, or a load on the system becomes large enough.

4.3—Maintenance of the Cloud Platform

The LCM 500 of each node 40 in the platform 100 may automatically perform maintenance tasks for the platform. As used herein, "maintenance tasks" includes both planned maintenance tasks that arise according to a specified schedule (e.g., periodic maintenance tasks) as well as reactionary maintenance tasks that arise in response to unplanned errors, failures, or other conditions.

In particular, the LCMs 500 may use the DKVS 30 to coordinate, via distributed decision making, which nodes 40 will perform which maintenance tasks. For example, when an LCM 500 believes that a maintenance task needs to be performed and that it is able to perform it, the LCM 500 may attempt to acquire a lock for the task in the DKVS 30, to ensure that the task is not already being performed by another node 40. If the LCM 500 is able to obtain the lock, then it goes ahead and performs the task. In the case of planned or periodic maintenance tasks, in some examples each of the LCMs 500 may be aware when such a task should be performed based on a schedule specified in the LCM program instructions 501. In the case of unplanned tasks (e.g., remediation of errors, failures, other conditions), the condition giving rise to the task may be detected by any one of the LCMs 500 by monitoring the status of the platform 100. As used herein, the status of the platform 100 may include both the configuration of the platform 100 (e.g., how many nodes, what roles the nodes are assigned, what services are activated and on which nodes, etc.), and the health of the platform 100 (e.g., are any nodes or services experiencing errors or failures or otherwise unhealthy).

Figure 7:
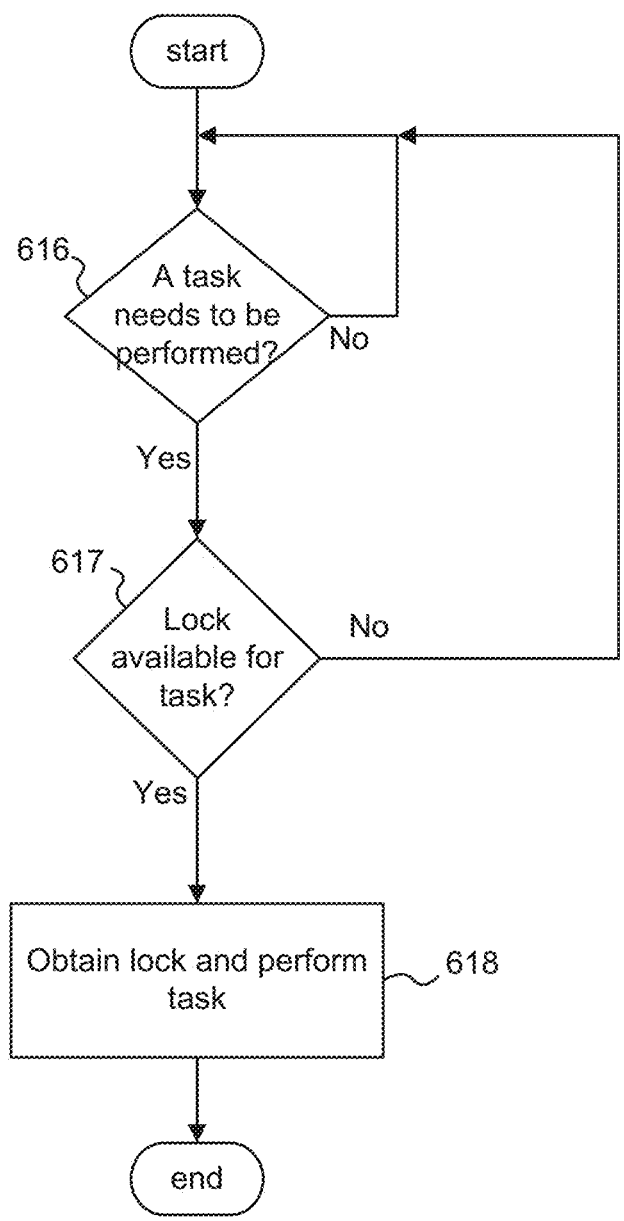
FIG. 7 is a process flow diagram illustrating an example process for maintaining a cloud platform.

For example, the LCMs 500 may execute the example operations illustrated in FIG. 7.

In block 616, the LCM 500 determines whether a maintenance task (planned or reactionary) needs to be performed. In particular, the LCMs 500 may determine whether maintenance tasks need to be performed by monitoring a task schedule or queue and/or monitoring the status of the platform 100. For example, the LCMs 500 may determine whether planned maintenance tasks need to be performed by monitoring a schedule of tasks specified in the LCM program instructions 501 and/or a task queue maintained in the DKVS 30. In addition, the LCMs 500 may determine whether reactionary maintenance tasks need to be performed by monitoring the status of the platform 100. For example, the LCM 500 may periodically decide, based on a current state of the platform 100, whether there any actions that could be taken to improve the state of the platform 100. If there is such an action, then the LCM 500 may consider the action to be a maintenance task that needs to be performed. Detecting actions that could improve the platform may include detecting errors, failures, or other conditions that adversely affect the platform 100 and, if such a condition is detected, automatically determining whether an action can be taken to remediate (fully or partially) the condition. When the LCM 500 has identified a maintenance task that needs to be performed, the LCM 500 proceeds to block 617.

For example, suppose that a service on a node 40 experiences an error or fails completely. Such an occurrence may be detected by the LCM 500 of another node 40 as a condition for which remedial action is warranted, and the detecting LCM 500 may then determine an action that would improve the platform 100 (i.e., remediate the failure), such as activing another instance of the failed service on another node 40. Thus, the LCM 500 may identify activing another instance of the failed service as a maintenance task that needs to be performed, and may proceed to block 617 on this task.

As another example, suppose that an entire node 40 fails or is otherwise disconnected from the rest of the platform. Such an occurrence may be detected by the LCM 500 of another node 40 as a condition for which remedial action is warranted, and the detecting LCM 500 may then determine an action that would improve the platform 100 (i.e., remediate the failure), such as a member node 40 reconfiguring itself to a specific role and/or taking on a portion of the load previously serviced by the failed node 40. Thus, the LCM 500 may identify reconfiguring into the specified role as a maintenance task that needs to be performed, and may proceed to block 617 on this task. The LCM 500 may also identify taking on a portion of the load previously serviced by the failed node 40 as another maintenance task that needs to be performed, and may proceed to block 617 on this task. Note that this example overlaps with the scaling function described above, since the failure of a node 40 is one example of a scaling event. In other words, in some circumstances, identifying a scaling event and determining that reconfiguration is needed in response to the scaling event (see blocks 610-613 of FIG. 6) can be an example of determining that a maintenance task needs to be performed (block 616 of FIG. 7).

As another example, a periodic maintenance task may include interrogating an inventory discovery source to see if changes have been made to the inventory or resource envelope of the platform 100. The LCM 500 of each node 40 may be aware when this periodic task should be performed, for example by consulting a task schedule. When the time for performing the task arrives, the first one of the LCMs 500 to notice this fact may determine that the maintenance task needs to be performed and may proceed to block 617.

In block 617, the LCM 500 determines whether a lock is available in a task queue of the DKVS 30 for the task that was identified in block 616. This may be done to ensure that multiple nodes 40 do not attempt to perform the same task at the same time. In some examples, the task identified in block 616 may not yet be listed in a task queue of the DKVS 30 (for example, if the LCM 500 was the first to identify a reactionary task), in which case the determining whether a lock is available may include posting the maintenance task to the task queue in the DKVS 30. If the task has already been reserved by another node 40 (i.e., the lock is unavailable), the LCM 500 may return to block 616 to continue monitoring for other maintenance tasks. In some examples, the LCM 500 may wait a predetermined amount of time before returning to block 616. If the lock is available, then the LCM 500 may continue to block 618.

In block 618, the LCM 500 obtains a lock for the maintenance task, and then performs the task. It should be understood that, in some examples, determining whether a lock is available and obtaining the lock may be performed as part of the same operation—for example, it may be determined whether a lock is available by attempting to obtain the lock, with the attainment of the lock indicating that the lock was available and the inability to attain the lock indicating that the lock was not available.

In some examples, in block 616 or 617 the LCM 500 may also determine whether its node 40 would be able to perform the task. For example, a node 40 may not be able to perform a task if it is too busy, does not have authorization, etc. If the node 40 is able to perform the action, then LCM 500 may continue to block 617 or 618 as described above. If, however, the node 40 is not able to perform the action, then the LCM 500 may loop back to block 616 and monitor for other tasks without obtaining a lock or performing the task. In some examples, even if the node 40 is not able to perform the task, the LCM 500 may still check the DKVS 30 in block 617 to verify that the task is included in the task queue, and if not the LCM 500 may post the task to the task queue.

In block 616, in some circumstances, the LCM 500 may determine that an action cannot be taken to remediate an identified condition. For example, the LCM 500 may be unaware of any remedial action for the condition. As another example, the LCM 500 may be aware of a remedial action but the remedial action may not currently be possible in view of the current state of the platform 100. In some examples, when the LCM 500 determines that an action cannot be taken to remediate a condition, then the LCM 500 does not identify a maintenance task.

In some examples, when an LCM 500 identifies that an action can be taken that would remediate an identified condition, in some circumstances the LCM 500 may simply perform the action on its own initiative rather than attempting to obtain a lock to perform an action. In particular, some actions that are not rivalrous may be performed without needing to obtain a lock in the DKVS 30. In this context, an action is not rivalrous if it is acceptable for more than one of the nodes 40 to perform the action. Because non-rivalrous actions can (and in some cases, should) be performed by multiple nodes 40, there is no need to reserve the action for one node 40 via a locking mechanism. An example of a not rivalrous action is a node 40 reconfiguring one or more of its own services to reflect a change in another service on another node 40, such as a change in the location of another service (some services depend on location and configuration of other services). Such an action is not rivalrous because it is acceptable (in some cases, desirable) for every node 40 to reconfigure its own services in response to such an event.

5—Example Processor Executable Instructions

Figure 8:
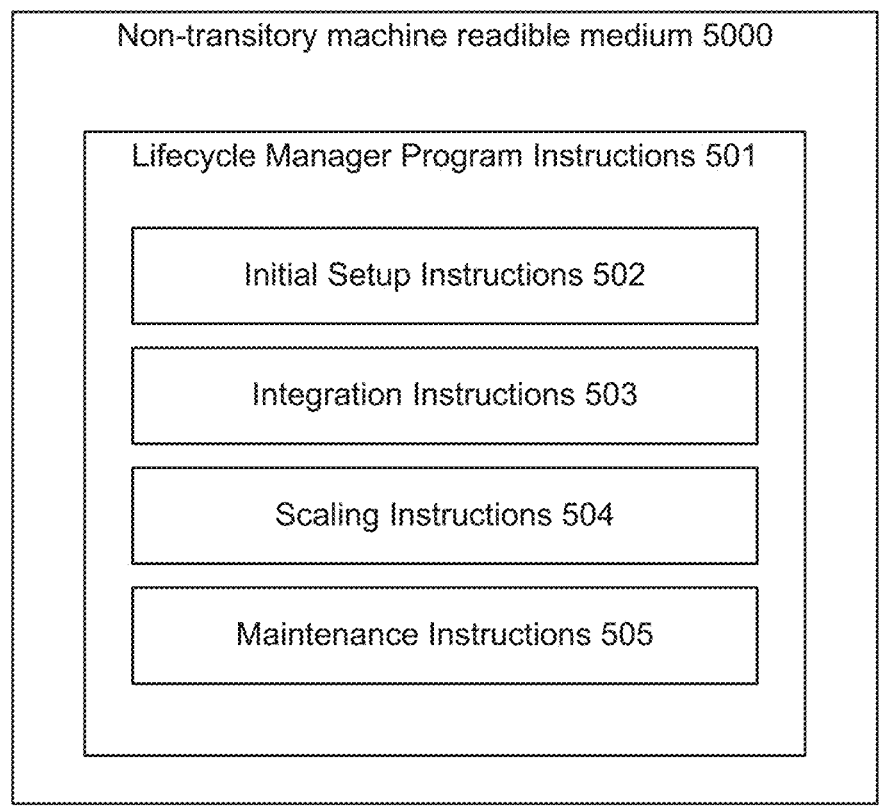
FIG. 8 illustrates an example non-transitory machine readable medium storing example lifecycle manager program instructions.

FIG. 8 illustrates example processor executable instructions stored on a non-transitory machine readable medium 5000. In particular, lifecycle manager (LCM) program instructions 501 are stored on the medium 5000.

The LCM instructions 501 may include instructions that, when executed, instantiate the LCM 500 described above. In particular, the LCM instructions 501 may include instructions to perform any or all of the operations that were described above as being performed by the LCM 500, including, for example, any of the example operations illustrated in FIGS. 4-8.

For example, the LCM instructions 501 may include initial setup instructions 502, integration instructions 503, scaling instructions 504, and maintenance instructions 505. The initial setup instructions 502 may include instructions to perform the operations of FIG. 4. The integration instructions 503 may include instructions to perform the operations of FIG. 5. The scaling instructions 504 may include instructions to perform the operations of FIG. 6. The maintenance instructions 505 may include instructions to perform the operations of FIG. 7.

For example, the initial setup instructions 502 may include instructions to the cause a node 40 to, in response to receiving a platform cluster creation request, automatically: establish a cloud platform 100 including the node 40 as a member; and invite other nodes 40 to join the cloud platform 100. In some examples, the establishing of the platform 100 includes automatically establishing a distributed key value cluster for communicating a state of the platform 100 among the nodes 40.

For example, the integration instructions 503 may include instructions to cause a node 40 to, in response to receiving an invitation to join a cloud platform 100, automatically integrate the respective node 40 into the cloud platform 100. In some examples, the automatically integrating the respective node 40 into the cloud platform 100 includes automatically joining a distributed key value cluster associated with the cloud platform 100. In some examples, the automatically integrating the respective node 40 into the cloud platform 100 includes automatically determining which services of the cloud platform 100 to activate on the respective node 40 based on a current configuration of the cloud platform 100. In some examples, the determining which services of the cloud platform 100 to activate on the respective node 40 includes automatically: identifying a role for the respective node 40 based on the current configuration of the second cloud platform 100, and selecting for activation those services of the cloud platform 100 that are associated with the identified role.

For example, the scaling instructions 504 may include instructions to cause a node 40 to, in response to detecting a change in a configuration of the cloud platform 100, automatically: determine whether changing a role of the respective node 40 would improve the configuration of the platform 100, and, in response to determining that changing the role of the respective node 40 would improve the configuration of the platform, attempt to change the role of the respective node 40.

For example, the maintenance instructions 505 may include instructions to cause a node 40 to monitor a status of the platform 100, based on the status, determine whether there is an action that would improve the status of the platform 100, and in response to identifying an action that would improve the status of the platform 100, attempt to perform the action. In some examples, the maintenance instructions 505 may include instructions to cause a node 40 to, in response to detecting a change in a health of a given service of the platform 100, automatically determine whether the respective node 40 should activate the given service. In some examples, the maintenance instructions 505 may include instructions to cause a node 40 to automatically: monitor a platform task list of the platform 100 for maintenance tasks that need to be performed, and in response to identifying a maintenance task that needs to be performed, attempt to perform the maintenance task.

6—Other Definitions

As used herein, to "provide" an item means to have possession of and/or control over the item. This may include, for example, forming (or assembling) some or all of the item from its constituent materials and/or, obtaining possession of and/or control over an already-formed item.

Throughout this disclosure and in the appended claims, occasionally reference may be made to "a number" of items. Such references to "a number" mean any integer greater than or equal to one. When "a number" is used in this way, the word describing the item(s) may be written in pluralized form for grammatical consistency, but this does not necessarily mean that multiple items are being referred to. Thus, for example, a phrase such as "a number of active optical devices, wherein the active optical devices . . . " could encompass both one active optical device and multiple active optical devices, notwithstanding the use of the pluralized form.

The fact that the phrase "a number" may be used in referring to some items should not be interpreted to mean that omission of the phrase "a number" when referring to another item means that the item is necessarily singular or necessarily plural.

In particular, when items are referred to using the articles "a", "an", and "the" without any explicit indication of singularity or multiplicity, this should be understood to mean that there is "at least one" of the item, unless explicitly stated otherwise. When these articles are used in this way, the word describing the item(s) may be written in singular form and subsequent references to the item may include the definite pronoun "the" for grammatical consistency, but this does not necessarily mean that only one item is being referred to. Thus, for example, a phrase such as "an optical socket, wherein the optical socket . . . " could encompass both one optical socket and multiple optical sockets, notwithstanding the use of the singular form and the definite pronoun.

Occasionally the phrase "and/or" is used herein in conjunction with a list of items. This phrase means that any combination of items in the list—from a single item to all of the items and any permutation in between—may be included. Thus, for example, "A, B, and/or C" means "one of: {A}, {B}, {C}, {A, B}, {A, C}, {C, B}, and {A, C, B}".

Various example processes were described above, with reference to various example flow charts. In the description and in the illustrated flow charts, operations are set forth in a particular order for ease of description. However, it should be understood that some or all of the operations could be performed in different orders than those described and that some or all of the operations could be performed concurrently (i.e., in parallel).

While the above disclosure has been shown and described with reference to the foregoing examples, it should be understood that other forms, details, and implementations may be made without departing from the spirit and scope of this disclosure.

What is claimed is:

1. A system, comprising:
 a number of nodes, each including a processor and a non-transitory machine readable medium storing a copy of an operating system image,
 wherein each copy of the operating system image comprises:
  a minimum set of artifacts of a cloud platform application; and
  lifecycle manager program instructions that, when executed by one of the number of nodes, instantiate a lifecycle manager for the one of the number of nodes that is to:
   in response to receiving a platform cluster creation request, automatically:
    establish a cloud platform of the cloud platform application including the respective node as a sole member; and
    invite others of the nodes to join the cloud platform; and
   in response to receiving an invitation to join an established cloud platform of the cloud platform application that was established by another one of the nodes, automatically integrate the respective node into the established cloud platform.

2. The system of claim 1,
 wherein the lifecycle manager is to, in establishing the cloud platform, automatically establish a distributed key value cluster for communicating a state of the cloud platform among the nodes.

3. The system of claim 1,
 wherein the lifecycle manager is to, in integrating the respective node into the established cloud platform, automatically join a distributed key value cluster associated with the established cloud platform.

4. The system of claim 1,
 wherein the lifecycle manager is to, in integrating the respective node into the established cloud platform, automatically determine which services of the cloud platform application to activate on the respective node based on a current configuration of the established cloud platform.

5. The system of claim 1,
 wherein the lifecycle manager is to, in integrating the respective node into the established cloud platform, automatically:
  identify a role for the respective node based on the current configuration of the established cloud platform and a desired configuration, and
  select for activation in the respective node those services of the cloud platform application that are associated with the identified role.

6. The system of claim 1
 wherein the lifecycle manager is to, upon integrating into the established cloud platform, automatically monitor for maintenance tasks to be performed and, in response to identifying a maintenance task to be performed, attempt to reserve the maintenance task via a distributed key value store of the established cloud platform.

7. The system of claim 6,
 wherein the lifecycle manager is to, in monitoring for maintenance tasks to be performed, automatically monitor a task queue of the established cloud platform for maintenance tasks that need to be performed.

8. The system of claim 6,
wherein the lifecycle manager is to, in monitoring for maintenance tasks to be performed, automatically monitor a status of the established cloud platform and detect unplanned maintenance tasks based on the status of the established cloud platform.

9. The system of claim 1,
wherein the lifecycle manager is to monitor for scaling events and, in response to detecting a scaling event, automatically determine whether and how the respective node should reconfigure itself in view of the scaling event.

10. The system of claim 1,
wherein the lifecycle manager is to, upon integrating into the established cloud platform, in response to detecting a change in a status of a given service of the established cloud platform, automatically determine whether the respective node should take an action in view of the change in the status of the given service.

11. A non-transitory machine readable medium storing an operating system image comprising:
a minimum set of artifacts of a cloud platform application; and
lifecycle manager program instructions that, when executed by a processor of a node, causes the node to instantiate a lifecycle manager that is to:
in response to receiving a cloud platform creation request, automatically:
establish a cloud platform of the cloud platform application including the node as a sole member; and
invite other nodes to join the first cloud platform;
in response to receiving an invitation to join an established cloud platform of the cloud platform application, automatically integrate the node into the established cloud platform.

12. The non-transitory machine readable medium of claim 11,
wherein the lifecycle manager is to, in automatically integrating the node into the established cloud platform, automatically determine which services of the cloud platform application to activate on the node based on a current configuration of the established cloud platform.

13. The non-transitory machine readable medium of claim 11,
wherein the lifecycle manager is to, in integrating the node into the established cloud platform, automatically:
identify a role for the node based on the current configuration of the established cloud platform and a desired configuration, and
select for activation in the node those services of the cloud platform application that are associated with the identified role.

14. The non-transitory machine readable medium of claim 11,
wherein the lifecycle manager is to, upon integrating into the established cloud platform, automatically monitor for maintenance tasks to be performed and, in response to identifying a maintenance task to be performed, attempt to reserve the maintenance task via a distributed key value store of the established cloud platform.

15. The non-transitory machine readable medium of claim 11,
wherein the lifecycle manager is to monitor for scaling events and, in response to detecting a scaling event, automatically determine whether and how the respective node should reconfigure itself in view of the scaling event.

16. A method, comprising:
generating an operating system image that includes a minimum set of artifacts of a cloud platform application and machine readable instructions to instantiate a lifecycle manager;
install a copy of the operating system image on a number of nodes, each comprising a processor and a non-transitory machine readable medium; and
send a cloud platform creation request to one of the nodes,
wherein, for each of the nodes, the lifecycle manager is to:
in response to receiving the cloud platform creation request, automatically:
establish a cloud platform of the cloud platform application including the one of the nodes as a sole member; and
invite others of the nodes to join the cloud platform;
in response to receiving an invitation to join an established cloud platform of the cloud platform application that was established by another one of the nodes, automatically integrate the respective node into the established cloud platform.

17. The method of claim 16,
wherein the lifecycle manager is to, in automatically integrating the node into the established cloud platform, automatically determine which services of the cloud platform application to activate on the respective node based on a current configuration of the established cloud platform.

18. The method of claim 16,
wherein the lifecycle manager is to, in integrating the node into the established cloud platform, automatically:
identify a role for the node based on the current configuration of the established cloud platform and a desired configuration, and
select for activation in the node those services of the cloud platform application that are associated with the identified role.

19. The method of claim 16,
wherein the lifecycle manager is to, upon integrating into the established cloud platform, automatically monitor for maintenance tasks to be performed and, in response to identifying a maintenance task to be performed, attempt to reserve the maintenance task via a distributed key value store of the established cloud platform.

20. The method of claim 16,
wherein the lifecycle manager is to monitor for scaling events and, in response to detecting a scaling event, automatically determine whether and how the respective node should reconfigure itself in view of the scaling event.

* * * * *